Nov. 17, 1931.  S. J. STRID  1,832,060
NUT LOCK
Filed Nov. 27, 1929
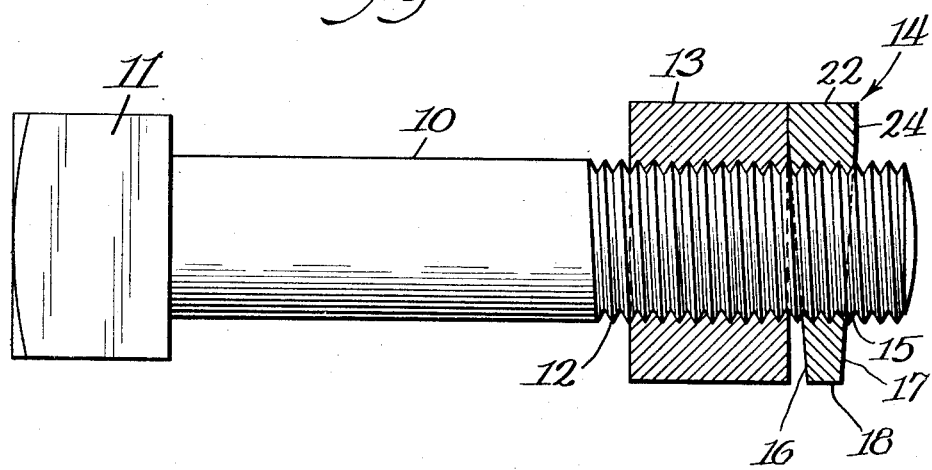
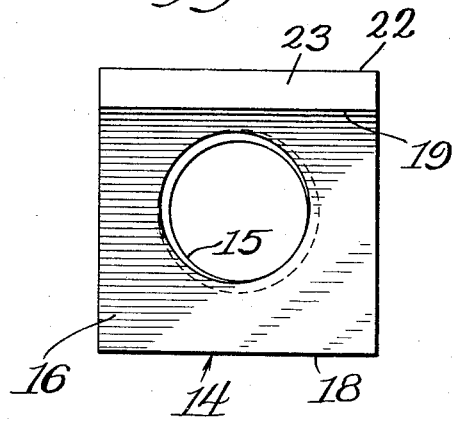
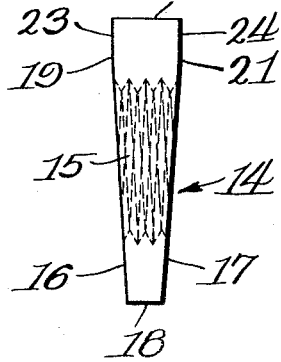
Inventor
Sven J. Strid
By Gillson, Mannolex
Attys.

Patented Nov. 17, 1931

1,832,060

UNITED STATES PATENT OFFICE

SVEN J. STRID, OF CHICAGO, ILLINOIS, ASSIGNOR TO T & S CORPORATION, A CORPORATION OF ILLINOIS

NUT LOCK

Application filed November 27, 1929. Serial No. 410,073.

This invention relates to nut locking devices or devices for preventing the accidental removal of nuts from threaded bolts and the like.

The principal object of the invention is the provision of a new and improved reversible nut lock having novel means for engaging the nut to prevent its turning on the bolt.

Another object of the invention is the provision of a new and improved nut lock that is inexpensive to manufacture, efficient in use, that is reversible, that may be readily applied to a bolt for holding the nut thereon, and that is adapted to be used in connection with the conventional nuts and bolts.

Other and further objects and advantages of the invention will appear from the following description taken in connection with the accompanying drawings, in which Fig. 1 is a side elevation of a bolt showing the invention in position thereon, with the nut and nut lock in vertical position;

Fig. 2 is a plan view of the nut lock;

Fig. 3 is a side elevation thereof.

Referring now to the drawings, the reference character 10 designates a conventional bolt having a head 11 at one end and having its opposite end threaded as shown at 12. A nut 13 of the usual or any well known construction is threaded on the outer end of the bolt.

In the use of lock nuts, it has been proposed to employ a triangular metallic member having a screw-threaded opening extending transversely through said member and threading the same on said bolt into engagement with said nut for preventing the removal of the nut, but that portion of the lock nut that engages the nut is substantially a knife edge. In other words there is only a line contact and as a result this knife edge will in time become worn where the parts are subjected to vibration as in their use on railway trains and the like. When this edge becomes worn away the locking device necessarily becomes loose and it and the nut may both in time become lost from the bolt.

The present invention seeks to remedy this defect by providing a flat face of more or less extended surface on each side of the device for engaging the nut. This flat surface is not readily worn away and hence the nut will be more securely held in adjusted position.

In the form of the device selected to illustrate one embodiment of the invention, the locking nut comprises a member 14 having a threaded opening 15 extending transversely therethrough.

The member 15 is tapered from, what for convenience of description, will be termed its inner and outer sides 16 and 17 toward one side 18 thereof. This taper, or the angles of these inclined surfaces, are substantially the same on both sides so that the member will be reversible. This taper extends beyond the bolt to a point 19 and 21 between the bolt and the side 22 opposite the tapered end. The sides 23 and 24 of the nut 14 between the points 19 and 21 and the side 22 of the member 14 are parallel and are at right angles to the axis of the opening 15.

In applying the device, the nut 13 is first threaded onto the bolt 10 to the required or desired extent, after which the locking nut or member 14 is screwed into firm contact with said nut 13. The flat face 23 or 24, depending on which is toward the nut, will engage the nut and upon further turning of the member 14 the force applied thereto will tend to spring or bend the bolt 10 slightly toward the tapered end and jamb the threads of the nut 14 into such frictional contact with the threads of the bolt as to lock the nut 13 in position on the bolt 10. The comparative wide faces 23 and 24 distribute the force over a large area whereby the wear due to vibration will not loosen the lock nut to any appreciable degree.

The flat faces 23 and 24 terminate between the side 22 and the adjacent portion of the bolt at a substantial distance from said bolt whereby considerable leverage is available for bending or springing the end of the bolt laterally, thereby materially assisting in locking the member 14 in frictional contact with the nut 13.

I claim as my invention:

A locking device for a nut comprising a member having a screw-threaded opening extending transversely therethrough, opposite sides of said device having parallel faces extending in planes substantially at right angles to the axis of said opening, said parallel faces extending from one edge of said member toward said opening and terminating short of the axis thereof, said member tapering from both sides from said parallel faces toward the opposite edge of said member, whereby when said member is threaded on to a bolt into firm engagement with a nut thereon, said bolt will be slightly distorted and said member will engage said nut with a broad bearing surface for preventing the turning of said nut on said bolt.

In testimony whereof I affix my signature.

SVEN J. STRID.